ABSTRACT
United States Patent [19]
Scherer et al.

[11] 3,738,119
[45] June 12, 1973

[54] HEAD PRESSURE OPERATED SUCTION THROTTLING VALVE

[75] Inventors: Carl A. Scherer, Clarence Center; Dale W. Lawson, Lockport, both of N.Y.

[73] Assignee: General Motors Corporation, Detroit, Mich.

[22] Filed: July 23, 1971

[21] Appl. No.: 165,535

[52] U.S. Cl.......................... 62/217, 62/224, 236/92
[51] Int. Cl.............................................. F25b 41/04
[58] Field of Search .................... 62/204, 205, 206, 62/222, 224, 217

[56] References Cited
UNITED STATES PATENTS

| | | | |
|---|---|---|---|
| 2,273,535 | 2/1942 | Peo | 62/217 |
| 1,990,663 | 2/1935 | Muttly | 62/217 |
| 2,061,599 | 11/1936 | Smith | 62/217 |

Primary Examiner—Meyer Perlin
Attorney—W. S. Pettigrew, J. C. Evans and K. H. MacLean, Jr.

[57] ABSTRACT

Refrigerating apparatus for an automobile air conditioning system including a pressure responsive expansion valve which opens to admit refrigerant to the evaporator in response to decreasing evaporator pressure for maintaining the evaporator pressure above a minimum level to prevent frost accumulation. A flow restricting throttling valve which is normally open, moves toward a closed position in the evaporator outlet to maintain evaporator pressure when head pressure downstream from the condenser falls to a predetermined level. Because changes in head pressure are proportional to changes in ambient temperature, the restriction of the evaporator outlet with decreasing head pressure permits the system to be operated at lower ambient temperatures without evaporator pressures falling below the frost formation level.

3 Claims, 3 Drawing Figures

PATENTED JUN 12 1973

3,738,119

INVENTORS
Carl A. Scherer &
BY Dale W. Lawson
K. H. MacLean, Jr.
ATTORNEY

HEAD PRESSURE OPERATED SUCTION THROTTLING VALVE

This invention relates to an automobile air conditioning system having a pressure responsive expansion valve and a pressure responsive throttling valve.

When refrigerant compressors are driven by a variable speed engine as is common in auto air conditioning systems, there is a tendency for frost to form on the evaporator under relatively cool ambient temperature operation. This is because under conditions of high compressor speed and low heat loads on the evaporator, the pressure in the evaporator drops considerably. Evaporator temperatures which cause frost to form correspond to evaporator refrigerant pressures below a critical freezing level.

Specifically, in an air conditioning system with a pressure responsive expansive valve, the valve is opened whenever the compressor capacity exceeds the heat load on the evaporator. This corresponds to most low ambient temperature operations. Under most conditions, the opening of the expansion valve supplies sufficient refrigerant to the evaporator to prevent its pressure from falling below the freezing level. A low ambient temperature is eventually reached, however, where a fully opened expansion valve cannot supply sufficient refrigerant to maintain the evaporator pressure above the critical freezing level. Operation of the system in ambient temperatures below this point may result in frost accumulation and blockage of the evaporator. The present air conditioning system includes a flow restricting throttling valve which starts to close at a predetermined low pressure level of refrigerant downstream from the condenser which corresponds to a predetermined low ambient temperature. Closing of the valve reduces refrigerant flow through the suction line to the compressor inlet to maintain refrigerant in the evaporator and the evaporator pressure above a freezing level. It has been observed that the refrigerant head pressure downstream from the condenser decreases correspondingly with decreases in ambient temperatures. Thus as ambient temperature falls, the corresponding lower head pressure acts to move the throttling valve toward a closed position.

It is an object of the invention to provide automobile refrigerating apparatus having a head pressure or condenser outlet pressure responsive throttling valve which moves to restrict refrigerant flow from the evaporator under a predetermined low head pressure and corresponding ambient temperature.

It is a further object of this invention to provide automobile refrigerating apparatus including an evaporator pressure responsive expansion valve which opens during predetermined low ambient temperature operations to supply sufficient liquid refrigerant to the evaporator for maintaining its pressure above a freezing level and a flow restricting throttling valve at the evaporator outlet responsive to refrigerant head pressures downstream from the condenser outlet which pressures correspond to ambient temperatures below the predetermined ambient temperatures thus restricting refrigerant flow from the evaporator and maintaining its temperature and pressure above a freezing level.

Further objects and advantages of the present invention will be apparent from the following detailed description, reference being had to the accompanying drawings in which a preferred embodiment of the invention is clearly shown.

Figure 1:
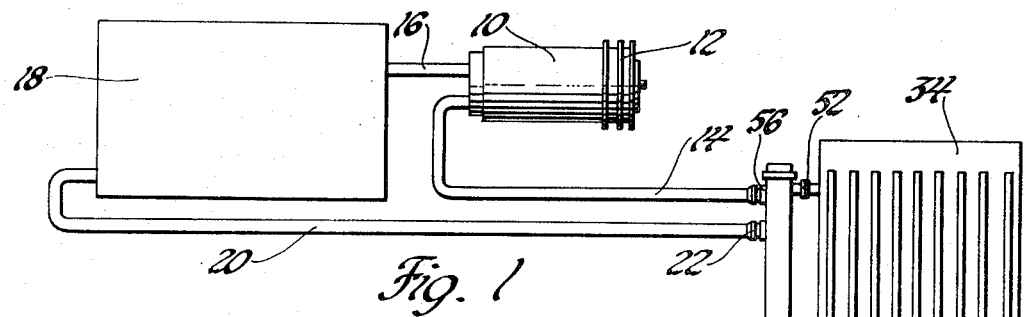
FIG. 1 is a diagrammatic view of an automobile air conditioning system employing the present head pressure responsive throttling valve.

Referring to FIG. 1, there is illustrated an automobile refrigerant compressor 10 provided with a pulley 12 adapted to be driven at a fixed speed ratio to the engine by a belt from a pulley on the front of the automobile engine crankshaft (not shown). The compressor 10 withdraws evaporated refrigerant through a suction conduit 14 and passes the compressed refrigerant through a discharge conduit 16 into an air cooled condenser 18 which is normally located in front of the automobile radiator.

Figure 2:
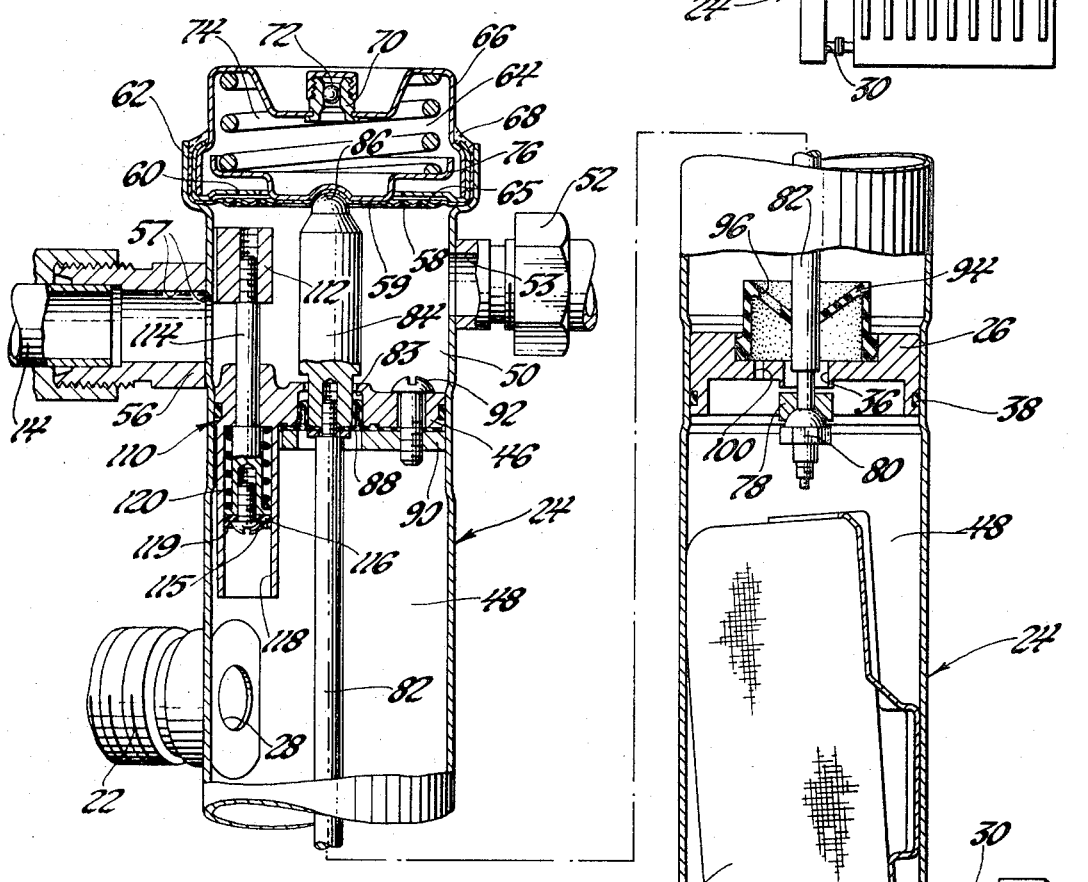
FIG. 2 is a fragmentary vertical sectional view in two parts through the combination expansion valve and throttling valve.

The compressed refrigerant is cooled and liquified in the condenser 18 and flows therefrom through conduit 20 to a fitting 22 through which it discharges into a tubular vertical receiver housing 24. In FIG. 2, circular valve seat member 26 is supported across the interior of the tubular receiver housing 24 between an inlet opening 28 and a fitting 30 adjacent an outlet opening 32 adapted to pass liquid refrigerant from the interior of housing 24 into an evaporator 34. Liquid refrigerant flows through a passage 36 in the valve seat member 26 from inlet opening 28 to outlet opening 32 and hence into the evaporator 34. An annular O-ring type seal 38 between the valve seat member 26 and the housing 24 prevents refrigerant leakage therebetween.

The bottom end of housing 24 is covered by a plug 40 threadably secured to the housing 24 by rolled threads 42 in the end of the tubular housing 24. An annular O-ring seal 44 between the plug 40 and the housing 24 prevents fluid leakage therebetween.

A wall member or partition 46 is supported within and across the upper end of tubular housing 24 and separates its interior into a lower metering chamber portion 48 and an upper control chamber portion 50. Metering portion 48 has inlet opening 28, valve seat member 26 and outlet opening 32 therein. The control portion 50 includes a fitting 52 about a passage 53 which is adapted to engage the outlet of the evaporator to cause refrigerant to flow from the evaporator into portion 50. Another fitting 56 about a passage 57 communicates the control portion 50 with the suction conduit 14 to pass refrigerant from the evaporator 34 to the compressor 10.

A flexible metal diaphragm 58 forms the upper surface of control chamber 50. Diaphragm 58 is fastened at its periphery between a backup plate 60 and the upper end 62 of the housing 24. The diaphragm 58 is exposed on one side 59 to refrigerant in chamber 50 from the evaporator outlet.

A reference pressure chamber 64 is formed around the upper side 65 of diaphragm 58 by a cup-shaped member 66 which is secured to backup plate 60 and end 62 by brazing at 68. The reference pressure chamber 64 is either filled with air at atmospheric pressure, with refrigerant or evacuated. A fitting 70 in member 66 is used to fill or evacuate chamber 64. A spherical valve member 72 seals chamber 64. A compression type coil spring 74 is supported between the upper portion of member 66 and the outer periphery of a plate 76. The center of plate 76 contacts the center portion of the diaphragm 58. Fluid pressure in chamber 64 and the spring 74 exerts a substantially constant pressure downward upon the upper side 65 of diaphragm 58. Refrigerant pressure from the evaporator outlet exerts a force in an upward direction on the lower side 59 of diaphragm 58 to establish an equilibrium position. When the refrigerant pressure in the evaporator outlet increases, the diaphragm 58 moves upward against the force of the coil spring 74 and as refrigerant pressure from the evaporator outlet decreases, the diaphragm 58 moves downward.

Upward and downward movements of the diaphragm 58 within the tubular housing 24 in response to pressure changes in control chamber 50 are transmitted to an expansion valve member 78 adjacent the lower side of the valve seat member 26. Valve member 78 is threadably secured by a fastener 80 to the lower end of a valve rod 82 which extends upward through passage 36, tubular member 24, and a bore 83 in the wall member 46. A centering member 94 supports the lower end of valve rod 82 centrally within passage 36. An opening 96 in member 94 admits refrigerant from inlet 28 to passage 36. A diaphragm follower member 84 is threadably secured at its lower end to the valve rod 82 and contacts the center portion 86 of diaphragm 58 at its upper end. An annular seal member 88 is centrally secured between the diaphragm follower 84 and the valve rod 82 and its peripheral edge is connected to the wall member 46 by an annular plate 90 and fasteners 92. Seal 88 prevents refrigerant leakage between metering portion 48 and control portion 50.

When refrigerant pressure within the control chamber 50 decreases which corresponds to a pressure decrease within the evaporator, diaphragm 58 moves downward against the follower 84 and valve rod 82 to move the valve member 78 to a more open position. When refrigerant pressure in control portion 50 increases which corresponds to a pressure increase within the evaporator 34, the diaphragm 58 moves upward against the force of spring 74 and the fluid force in chamber 64 to move the valve element 78 to a more closed position toward the lower end of the valve seat member 26.

In operation of the refrigerating system, high pressure liquid refrigerant from the condenser 18 is expanded to a low pressure condition subsequent to passage through opening 36. Refrigerant which flows from passage 36 to the evaporator passes through a bag 98 of dessicant material to absorb moisture from the refrigerant.

As previously stated, the subject expansion valve is responsive to evaporator refrigerant pressure to open and close the expansion valve when the evaporator outlet pressure changes. Expansion valves which are responsive to the refrigerant temperature at the evaporator outlet, maintain a superheat temperature of refrigerant. Superheat is a measure of the temperature of a vapor above its boiling point at a given pressure. The pressure responsive expansion valve does not always maintain superheat. When compressor capacity exceeds the heat load on the evaporator which condition corresponds to most high ambient temperature highway conditions, the expansion valve opens to flood the evaporator with liquid refrigerant. This has an advantage when used with parallel finned tube type evaporators. These evaporators have a tendency to develop hot spots caused by the formation of superheated vapor on one side of the core and liquid refrigerant on the other. The liquid refrigerant flooding of the evaporator caused by opening of the present expansion valve tends to wash out the hot spots.

Under conditions of high evaporator load, and low compressor speed which often occurs when the motor vehicle is idling, the expansion valve tends to close due to a pressure increase in the evaporator. This maintains evaporator pressure above that needed to prevent forst accumulation on the evaporator. However, expansion valve closing may not provide enough refrigerant flow through the evaporator to maintain a minimum cool air discharge temperature into the passenger compartment. Thus, a small continually open bleed passage 100 may be provided in member 26 to allow leakage of enough refrigerant to the evaporator for minimum cooling.

The refrigerant used in many automobile air conditioning systems is refrigerant 12, a fluorocarbon compound with the general formula $CCl_2F_2$. It changes from a liquid to a vapor or boils at a temperature slightly above 32° F. under a pressure of about 28 psig. It is desirable to maintain the refrigerant pressure in the evaporator above 28 psig to prevent the evaporator temperature from falling below 32° F and resultant frost accumulation on the evaporator.

Figure 3:
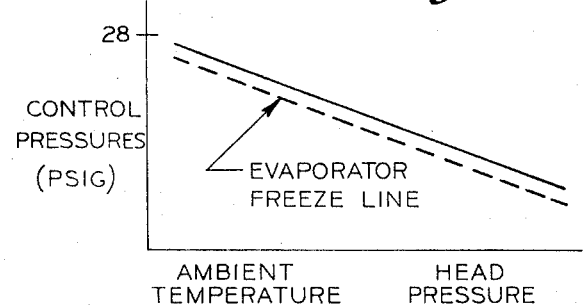
FIG. 3 is a graph showing the relation of control pressures to ambient temperature and head pressures for the system disclosed.

Normally, the present pressure responsive expansion valve controls refrigerant flow into the evaporator for maintaining at least a 28 psig pressure level therein to prevent freezing evaporator temperatures. As the ambient temperature increases however, it has been observed that evaporator pressures lower than 28 psig can be tolerated without frost formation. This is partially explained by the increased rate of heat input to the evaporator due to an increased temperature difference between the faces of the evaporator under higher ambient temperature conditions. FIG. 3 shows this observation by illustrating the relation of control pressure in chamber 50 to ambient temperature for a given evaporator and refrigerant system. The broken line represents the evaporator freeze line below which frost will accumulate at corresponding control pressures and ambient temperatures. It is known that refrigerant head pressure at the condenser outlet is nearly independent of the automobile speed but is proportional to changes in ambient temperatures. Thus, increased ambients will produce proportionate increases in head pressures over a given speed range. This relation explains the dual labeling of the horizontal axis of the graph in FIG. 3.

The subject expansion valve utilizes the relation between ambient temperature and head pressure to effectively decrease the control pressure and thus the position of the valve with increases in head pressure at the inlet of the expansion valve. Specifically, the area of the seal member 88 exposed to head pressure in the metering portion is made slightly greater than the area of the valve member 78 exposed to head pressure. Thus the net force due to head pressure acting on the valve rod 82 is upward and the force increases with increases in head pressure. This upward force tending to close the valve passage 36 is supplementary to the control pressure force chamber 50 and effectively reduces the control pressure maintained in the chamber for any given position of valve element 78. Thus at relatively low head pressures which correspond to low ambients, only a relatively small supplemental force is applied to valve rod 82 and the evaporator pressure is maintained above 28 psig. At relatively higher head pressures corresponding to higher ambient temperatures, a larger supplemental force on rod 82 is applied which effectively lowers the control pressure and evaporator pressure below 28 psig. The control pressure relation to ambient temperature for a given compressor speed is shown in a solid line in FIG. 3. The relative areas of seal 88 and valve element 78 can be modified to produce a desirable control pressure profile nearly paralleling the evaporator freeze line (broken lines) as in FIG. 3.

Because of high refrigerant withdrawal rates from the evaporator when the compressor capacity exceeds the heat load on the evaporator, the present expansion valve will open as the evaporator outlet pressure falls. Low ambient temperature operation of the refrigerating system produces these conditions of low heat load, decreasing evaporator pressure and resultant opening of the expansion valve which tends to flood the evaporator with liquid refrigerant. The expansion valve will be able to maintain evaporator pressure above the critical 28 psig freeze level by fully opening until a critical low ambient temperature is reached. At ambients below this critical temperature, the valve cannot open further to supply enough refrigerant to the evaporator for pressure maintenance. It has been found in one system that the critical ambient temperature was about 50° F. At ambient temperatures lower than 50° F, the evaporator pressure began to fall below 28 psig.

The present air conditioning system includes a flow restricting throttling valve assembly 110 across the evaporator outlet when closed. The throttling valve 110 includes a slidable face seal member 112 which reciprocates upward and downward to control the quantity of refrigerant withdrawn from the evaporator 34. Valve member 112 is connected by a piston rod 114 and fastener 115 to a piston 116 reciprocal within a cylinder 118. The lower end of cylinder 118 extends into the metering chamber 48 of the expansion valve. The cylinder 118 is formed in a portion of wall member 46.

The lower end of cylinder 118 which extends into metering chamber 48 exposes the lower end 119 of piston 116 to head pressure from the condenser outlet. A compression type coil spring 120 between member 46 and the piston 116 exerts a closing force on the piston and valve element 112. During normal operation of the system above, the aforesaid critical ambient temperature head pressure acting on face 119 of piston 116 moves the interconnected piston and valve element to the fully open position shown in FIG. 2. Above the critical ambient temperature, evaporator pressure is maintained solely by controlling the quantity of liquid refrigerant flowing through passage 36 of the expansion valve. When the refrigerating system is operated below the critical ambient temperature, however, the head pressure within the metering portion 48 decreases to a level which allows the force of coil spring 120 to overcome the pressure force on piston 116. In response, the valve element 112 is moved downward to restrict the entrance to suction line 14. The pressure in the evaporator is maintained by heating of refrigerant in the evaporator. This prevents the evaporator pressure and temperature from falling below 28 psig and 32° F and frost accumulation on the evaporator. In the refrigerating system previously mentioned, ambient temperature operation down to about 32° F is possible with the throttling valve 112 starting to close at about 150 psig head pressure. The valve 112 closed to block 75 percent of opening 57 at about 75 psig head pressure. This allows the air conditioning system to be operated continuously above the minimum 32° F temperature without the use of costly temperature sensing controls and a compressor cycling means. The expansion valve and pressure operated throttling valve are adapted to be used with an inexpensive on-off temperature sensing switch in the compressor clutch energization circuit. This switch opens at an ambient temperature slightly above the freezing temperature and may be a bimetal type. Although the present throttling valve is desirable for use with the aforedescribed type of pressure responsive expansion valve, it is contemplated that applications in combination with other types of expansion valves such as thermally responsive valves may be used.

While the embodiment of the invention as described above and illustrated in the drawings constitutes a preferred form, other forms may be adapted.

What is claimed is as follows:

1. Refrigerating apparatus for an automobile air conditioning system comprising: an evaporator with an inlet and an outlet; a refrigerant compressor with its inlet connected by a suction conduit to the evaporator outlet; a condenser with its inlet connected to the compressor outlet; and expansion valve with an inlet connected to the condenser outlet and an outlet connected to the inlet of the evaporator; said expansion valve having a refrigerant passage between its inlet and outlet for the passage of refrigerant from said condenser to said evaporator; a movable valve member coactive with said passage for controlling the supply of refrigerant introduced into the evaporator and opening when refrigerant pressure within the evaporator decreases to a predetermined level to supply refrigerant to the evaporator for maintaining the evaporator pressure above a minimum level to prevent frost accumulation upon the evaporator; refrigerant flow control valve means between said evaporator outlet and compressor inlet responsive to decreasing refrigerant pressure between said condenser outlet and said expansion valve passage which corresponds to operation of the system below predetermined ambient temperature to move the valve means toward a closed position to restrict the withdrawal of refrigerant from the evaporator through the suction conduit for maintaining refrigerant pressure in the evaporator above said minimum level.

2. Refrigerating apparatus for an automobile air conditioning system comprising: an evaporator with an inlet and an outlet; a refrigerant compressor with its inlet connected by a suction conduit to the evaporator outlet; a condenser with its inlet connected to the compressor outlet; a refrigerant pressure responsive expansion valve with an inlet connected to the condenser outlet and an outlet connected to the inlet of the evaporator; said expansion valve having a refrigerant passage between its inlet and outlet for the passage of refrigerant from said condenser to said evaporator; a movable valve member coactive with said passage for controlling the supply of refrigerant introduced into the evaporator and opening in response to a decrease in refrigerant pressure within the evaporator to introduce refrigerant thereto for maintaining the evaporator pressure above a minimum level which prevents frost accumulation upon the evaporator; refrigerant flow control valve means between said evaporator outlet and compressor inlet to restrict the withdrawal of refrigerant from the evaporator by the compressor for maintaining refrigerant pressure in the evaporator above said minimum level; said flow restricting valve including a member movable from an open position toward a closed position in response to decreasing refrigerant pressures between said condenser outlet and said expansion valve passage to a value below a level corresponding to operation of the refrigerating system at ambient temperatures below a predetermined temperature.

3. Refrigerating apparatus for an automobile air conditioning system comprising: an evaporator with an inlet and an outlet; a refrigerant compressor with its inlet connected by a suction conduit to the evaporator outlet; a condenser with its inlet connected to the compressor outlet; a refrigerant pressure responsive expansion valve with an inlet connected to the condenser outlet and an outlet connected to the inlet of the evaporator; said expansion valve having a refrigerant passage between its inlet and outlet for the passage of refrigerant from the condenser to said evaporator; a movable valve member coactive with said passage for controlling the supply of refrigerant introduced into the evaporator and said valve member opening in response to a decrease in refrigerant pressure within the evaporator to introduce refrigerant for maintaining the evaporator pressure above a minimum level which prevents frost accumulation upon the evaporator; refrigerant flow control valve means between said evaporator outlet and compressor inlet to restrict the withdrawal of refrigerant from the evaporator for maintaining refrigerant pressure in the evaporator above said minimum level; said flow restricting valve including a reciprocal valve member interconnected by a valve rod to a piston one side of which is exposed to refrigerant pressure between said condenser outlet and said expansion valve passage to cause said valve member to move toward a more closed position in response to decreasing refrigerant pressure to a value below a level corresponding to operation of the refrigerating system at ambient temperatures below a predetermined temperature.

* * * * *